US006810208B2

(12) United States Patent
Saiki et al.

(10) Patent No.: US 6,810,208 B2
(45) Date of Patent: Oct. 26, 2004

(54) ELECTRIC DISCHARGE TUBE, METHOD OF MANUFACTURING THE TUBE, STROBOSCOPIC DEVICE USING THE TUBE AND CAMERA

(75) Inventors: Hiroshi Saiki, Kyoto (JP); Fumiji Omura, Kyoto (JP); Tsutomu Takahashi, Kyoto (JP)

(73) Assignee: West Electric Co., Ltd., Osaka (JP)

( * ) Notice: Subject to any disclaimer, the term of this patent is extended or adjusted under 35 U.S.C. 154(b) by 0 days.

(21) Appl. No.: 10/468,339

(22) PCT Filed: Feb. 18, 2002

(86) PCT No.: PCT/JP02/01376

§ 371 (c)(1), (2), (4) Date: Feb. 4, 2004

(87) PCT Pub. No.: WO02/067289

PCT Pub. Date: Aug. 29, 2002

(65) Prior Publication Data

US 2004/0114917 A1 Jun. 17, 2004

(30) Foreign Application Priority Data

Feb. 19, 2001 (JP) ....................................... 2001-041351
Aug. 9, 2001 (JP) ....................................... 2001-242886
Aug. 9, 2001 (JP) ....................................... 2001-242887

(51) Int. Cl.[7] ........................... G03B 15/05; H01J 61/54
(52) U.S. Cl. ........................ 396/155; 313/594; 313/595; 313/613; 313/631; 313/635
(58) Field of Search .......................... 395/155; 313/594, 313/595, 613, 631, 635

(56) References Cited

U.S. PATENT DOCUMENTS 6,531,832 B1 * 3/2003 Hirata et al. ............. 315/241 P
6,707,251 B2 * 3/2004 Chow et al. ................ 313/594

FOREIGN PATENT DOCUMENTS

| | | | |
|---|---|---|---|
| JP | 59-167947 | A | 9/1984 |
| JP | 62-206761 | A | 9/1987 |
| JP | 7-21991 | A | 1/1995 |
| JP | 9-102298 | A | 4/1997 |
| JP | 9-199084 | A | 7/1997 |
| JP | 11-120957 | A | 4/1999 |
| JP | 2000-123789 | A | 4/2000 |
| JP | 2000-171864 | A | 6/2000 |

OTHER PUBLICATIONS

International Search Report for PCT Application No. PCT/JP02/01376 mailed May 28, 2002.
Form PCT/ISA/210 English Translation.

* cited by examiner

*Primary Examiner*—W. B. Perkey
(74) *Attorney, Agent, or Firm*—RatnerPrestia

(57) ABSTRACT

An electric discharge tube withstands a large electric input, and has a small size. This discharge tube provides a small photographic strobe device and a small photographic camera. The discharge tube includes a glass bulb having a wall thickness ranging from 0.2 to 0.6 mm and filled with rare gas, a pair of main electrodes provided at both ends of the glass bulb, respectively, a trigger electrode formed on the outer surface of the glass bulb, and a film of silicon dioxide having a thickness ranging from 0.05 to 0.11 $\mu$m formed inside of the glass bulb. An electric power not larger than 0.90 Ws/mm$^3$ with respect to the inner volume of the glass bulb is applied between the main electrodes.

24 Claims, 8 Drawing Sheets

ELECTRIC DISCHARGE TUBE, METHOD OF MANUFACTURING THE TUBE, STROBOSCOPIC DEVICE USING THE TUBE AND CAMERA

THIS APPLICATION IS A U.S. NATIONAL PHASE APPLICATION OF PCT INTERNATIONAL APPLICATION PCT/JP02/01376.

TECHNICAL FIELD

The present invention relates to an electric discharge tube used as an artificial light source for photographic, and particularly to a discharge tube having a durability to an electric input for light emission, and a strobe device and a camera including the tube.

BACKGROUND ART

An electric discharge tube used as an artificial light source incorporated in a photographic strobe device or photographic camera is required to be have a small size and a large light emission capacity for portable use. Such discharge tube includes a glass bulb and a pair of main electrodes, i. e., an anode and a cathode, provided at both ends of the glass tube and is filled with rare gas. The discharge tube discharges to emit light by an electric input supplied between the main electrodes.

The amount of the emitted light increases as the electric input is larger, as known well, and the requirement needs a decrease of the size of the glass bulb and an increase of the electric input. However, the increase and the decrease is limited. An electric input exceeding its limit may crack or break the glass bulb with a smaller number of light emissions, and hence, the excessive electric input cannot be applied.

An electric discharge tube having a large strength of glass bulb and an enhanced durability to the electric input is disclosed in Japanese Patent Laid-Open Publication No.62-206761. This discharge tube includes a thin film of silicon dioxide formed on inner and outer surfaces of a glass bulb, and hence has an enhanced strength of the glass bulb to an electric input for light emission without including a quartz tube having a large strength.

The strength to the electric input applied to the discharge tube is influenced by various factors. Therefore, the thin film of silicon dioxide on the inner and outer surfaces of the glass bulb may not provide the discharge tube having the enhanced strength of the glass bulb by itself.

In addition, the discharge tube is recently demanded to have a small size. The increase of the strength of the glass bulb allows the discharge tube to have the small size, and accordingly provides a photographic strobe device and a photographic camera having small sizes.

SUMMARY OF THE INVENTION

An electric discharge tube can withstand a large electric input, and have s small size. The discharge tube provides a photographic strobe device and a photographic camera having small sizes. The discharge tube includes a glass bulb having a wall thickness of 0.2 mm to 0.6 mm and filled with rare gas, a pair of main electrodes provided at both ends of the glass bulb, respectively, a trigger electrode formed on an outer surface of the glass bulb, and a film of silicon dioxide having a thickness of 0.05 to 0.11 $\mu$m and formed inside of the glass bulb. An electric power not larger than 0.90 Ws/mm$^3$ with respect to an inner volume of the glass bulb is applied to the main electrodes.

DETAILED DESCRIPTION OF PREFERRED EMBODIMENTS

Embodiment 1

Figure 1:
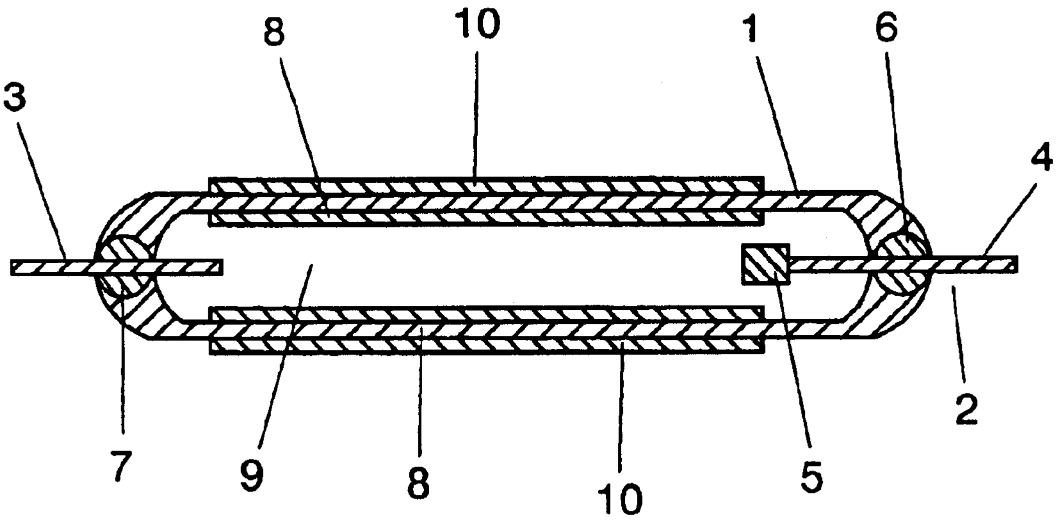
FIG. 1 is a sectional view of an electric discharge tube according to exemplary embodiment 1 of the present invention.
Figure 2:
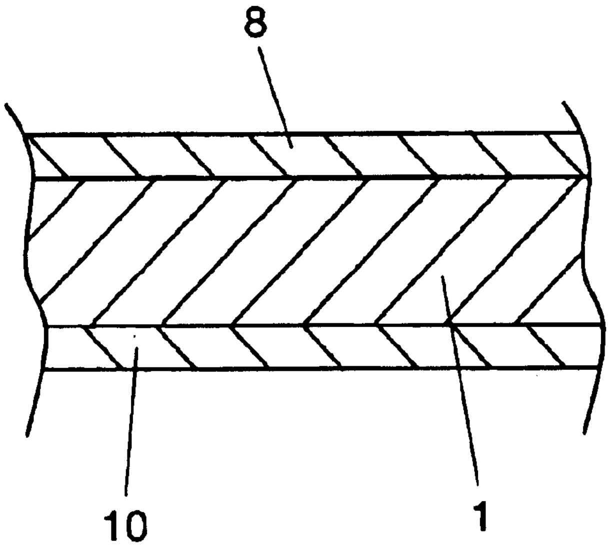
FIG. 2 is a partially enlarged sectional view of the discharge tube according to embodiment 1.

FIG. 1 is a sectional view of an electric discharge tube according to exemplary embodiment 1 of the present invention. The discharge tube includes a glass bulb 1 made of hard glass of borosilicate, and main electrodes 2, 3 provided at both ends of the glass bulb, respectively. The main electrode 2 is a cathode electrode connected to a low-voltage side of a main discharge capacitor for a light-emission-energy supply described below, and the electrode 2 is composed of a metal body 4 and a sintered metal body 5. The main electrode 3 is an anode electrode connected to a high-voltage side of the main discharge capacitor. The metal body 4, a lead wire for inputting an electric power for light emission, is sealed at an end of the glass bulb 1 and forms the main electrode 2. The sintered metal body 5 is provided at the leading end of the metal body 4 positioned in the glass bulb 1 by crimping or welding to form the main electrode 2. A bead glass 6 seals the metal body 4 to the end of the glass bulb. A bead glass 7 seals a metal body 3 to the end of the glass bulb. The metal body 3 is a lead wire for inputting the electric power for light emission and sealed at the end of the glass bulb. A protective film 8 of silicon dioxide having a light permeability and formed inside of the glass bulb 1 is thinly applied on an inner surface of the glass bulb 1, is baked at a high temperature, thus being formed, as shown in FIG. 2. The inside 9 of the glass bulb has a specified volume filled with rare gas, such as xenon. A trigger electrode 10 is provided with a trigger voltage of high voltage for exciting discharge of the discharge tube, and is formed of a transparent film made of known oxide metal, such as tin or indium.

Figure 3:
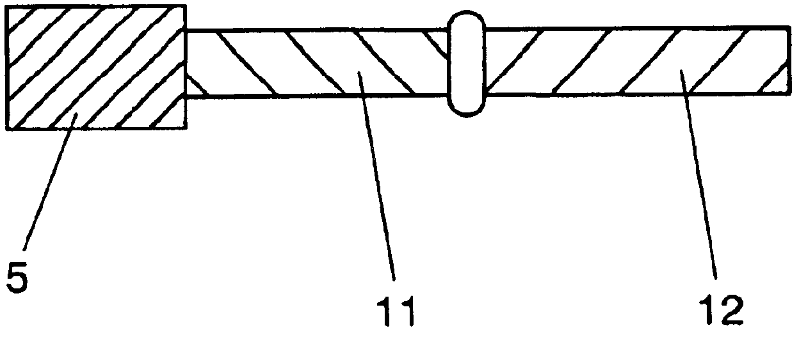
FIG. 3 is an enlarged sectional view of main electrodes of the discharge tube according to embodiment 1.

The sintered metal body 5 composing the main electrode 2 is formed by pressing fine metal powder, such as tantalum or niobium, and baking the pressed powder at high temperature of about 1500° C. The metal body 4 may be made of single metal, such as tungsten or Kovar. The metal body may be formed, as shown in FIG. 3. That is, a portion 11 positioned in the glass bulb 1 may be made of metal having a high melting point, such as tungsten, and a metal body 12 projecting from the glass bulb and provided with an electric power may be made of easy-to-process metal, such as nickel, thus providing the metal body by joining the portions 11 and 12 by welding.

The main electrode 3 may be made of single metal, such as tungsten or Kovar, or made of a joined metal body of tungsten and nickel, as shown in FIG. 3.

Figure 4:
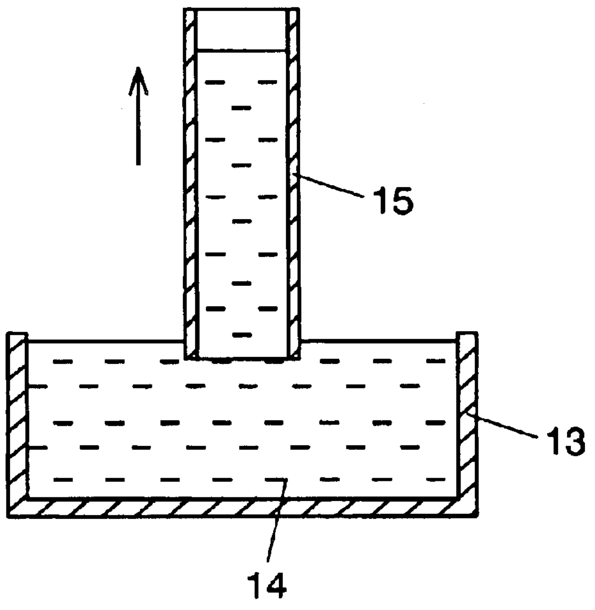
FIG. 4 is a sectional view showing a method of applying silanol solution for forming a protective film inside of the discharge tube according to embodiment 1.

In the discharge tube having such configuration, a method of forming a protective film 8 will be explained by referring to FIG. 4.

To manufacture the protective film 8, first, mixed solution of silanol, methanol, ethyl acetate and ethanol is contained in a container 13. An end of a glass tube 15 is immersed in silanol solution 14 in the container 13. Then, a vacuum pump (not shown) connected to the other end of the glass tube 15 pumps up the silanol solution in a direction of an arrow, and raises the silanol solution 14 to a predetermined position, except for respective sealing portions corresponding to the main electrodes 2, 3. Thus, the silanol solution 14 is applied to the inner surface of the glass tube 15. Then, the glass tube 15 is taken out from the solution, and the silanol solution inside of the glass tube 15 is discharged. Thereby, an applied film of silanol solution (hereinafter called "a silanol film") is formed as the protective film of silicon dioxide on the inner surface of the glass tube. One of the silanol solution is shown in Table 1.

TABLE 1

| | |
|---|---|
| Silanol ($Si(OH)_4$) | 13 wt. % |
| Methanol ($CH_3OH$) | 26 wt. % |
| Methyl Acetate ($CH_3COOCH_3$) | 25.8 wt. % |
| Ethanol ($C_2H_5OH$) | 24 wt. % |
| Ethyl Acetate ($CH_3COOC_2H_5$) | 11 wt. % |
| Diphosphorus Pentoxide ($P_2O_5$) | 0.2 wt. % |

The lower end portion of the glass tube 15 immersed in the silanol solution is a portion of sealed with the other main electrode, thus having the protective film removed from this portion. The silanol film may be removed from the portion with the undesired protective film which is sealed with the other main electrode by brushing, or may be removed by the following method.

After applying the silanol film, air or nitrogen is blown into the glass tube to dry the silanol film, and the undesired portion of the film of the glass tube is immersed in silanol-film-removing agent, such as 30% aqueous solution of sodium hydroxide, 30% aqueous solution of potassium hydroxide, or 2% aqueous solution of hydrofluoric acid, for a short time, such as several seconds. Alternatively, after temporarily baking the silanol film at a temperature of about 150° C. after drying the silanol film, the undesired portion of the film is immersed in 5% aqueous solution of hydrofluoric acid or 10% aqueous solution of ammonium fluoride for a short time, such as 2 to 5 seconds to remove the film, and then, the portion of the silanol film is washed in water.

After having the undesired portion of the silanol film removed by the above method, the glass tube 15 is put in the container, and is gradually heated up to a temperature of 150° C., and is then maintained at the first stage temperature of 150° C. for about 15 to 30 minutes. Then, the temperature is gradually raised to a second stage of about 300° C., and the temperature of 300° C. is maintained for about 15 to 30 minutes. Then, the temperature is gradually raised up to a third stage of 600 to 650° C. After the temperature of 600 to 650° C. is maintained for, e. g. about 30 minutes, the film of silicon dioxide is baked, thus providing a protective film formed on the glass tube.

In this manner, the protective film 8 is preferably baked and formed by raising the temperature gradually from a low temperature to a high temperature, and maintaining the temperature at the first to third stages each for tens of minutes. If the glass tube is suddenly put into a container of high temperature, such as 650° C. to be baked, the silanol film may be cracked or other troubles may occur. The baking temperatures and the temperature-hold time at each stage for forming the protective film 8 may be properly determined according to the thickness of the silanol film or the like.

The thickness of the protective film 8 of silicon dioxide formed in such manner can be adjusted by, for example, changing the concentration of the silanol solution, or adjusting the discharging speed of the silanol solution discharged from the glass tube after the applying of the silanol film.

The silanol film may be applied by coupling the glass bulb fixed and held to the container filled with silanol solution with a coupling tube and by then moving up the container containing the silanol solution (not shown).

In the glass tube 15 having the protective film 8 of silicon dioxide thus formed, a trigger electrode 10 of a known transparent conductive film of transparent oxide metal, such as tin or indium, is formed on an outer surface of the bulb. Then, the main electrodes 2, 3 are sealed at both ends of the glass tube 15, respectively, and the glass tube is sealed with a required amount of rare gas, such as xenon, thus providing the electric discharge tube.

Figure 6:
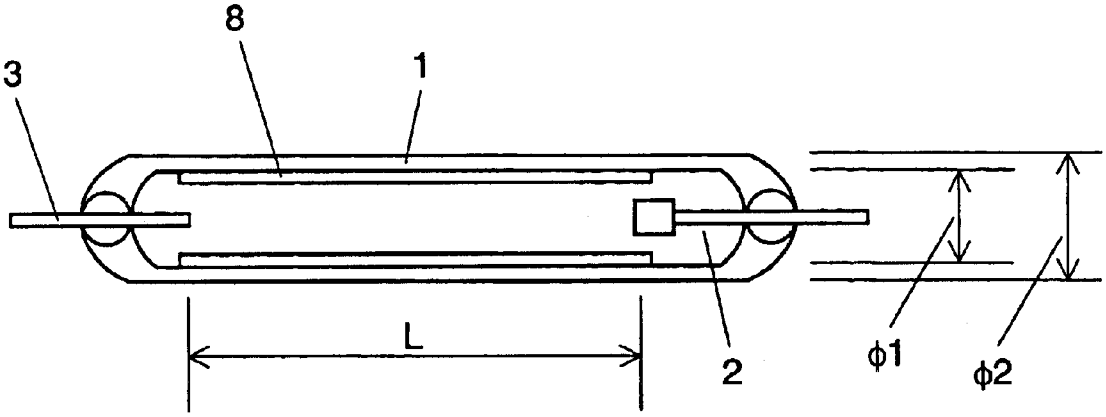
FIG. 6 is a schematic diagram of discharge tubes for explaining performance comparison test of the discharge tube of the embodiment and a conventional electric discharge tube.

In the discharge tube of the embodiment having such configuration, as shown in FIG. 6, the glass bulb 1 is made of glass material of borosilicate having the inside diameter (ϕ1) of 3.0 mmϕ, and the bulb 1 is filled with 100 kPa of xenon as the rare gas. A discharge gap (L) between the main electrodes 2, 3 shown in FIG. 1 in the glass bulb 1 is 26 mm. The protective film 8 of silicon dioxide is formed inside of the glass bulb 1, and the trigger electrode 10 is formed on the outer surface of the glass bulb 1. The wall thickness (ϕ2-ϕ½) of the glass bulb 1 was changed in a range from 0.2 to 0.6 mm thicker than a lower limit of a practical use, and the thickness of the film of silicon dioxide ($SiO_2$), i. e., the protective film formed inside of the glass bulb was changed in a range from 0.03 μm to 0.13 μm. Ten samples of each combinations of the thicknesses of the bulbs and the films were prepared.

The thickness of the film of silicon dioxide formed in the glass bulbs 1 was measured by testing the glass tube by Auger electron photometric analysis. Then, by fixing a condition for forming the silicon dioxide film, for example, the concentration of the silanol solution, the same thickness of silicon dioxide is fabricated in the glass tube. Each glass tube is used for fabricating the discharge tube according to a specification described above.

On the other hand, in order to prepare conventional discharge tubes having no film inside of the glass bulb of the borosilicate glass material in the embodiment, the bulb is filled with 100 kPa of xenon as the rare gas. Similarly to the embodiment, the discharge gap between main electrodes was set at 26 mm. Ten samples of each were fabricated in the same specification as in the embodiment.

Figure 5:
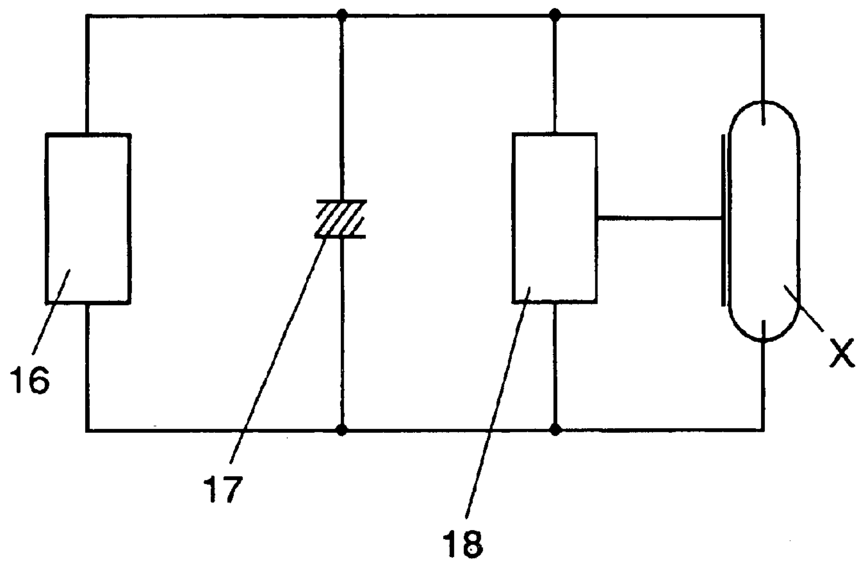
FIG. 5 is a circuit diagram of a circuit for testing light emission of the discharge tube according to embodiment 1.

The discharge tubes of the embodiment and the conventional tube were tested in light emission with an electric circuit shown in FIG. 5. The light emission circuit in FIG. 5 is a basic circuit of a photographic strobe device. A main discharge capacitor 17 is charged by a direct-current power source 16, and an electric power is supplied as a light emission energy to a test discharge tube X measured for evaluation. A trigger circuit 18 supplies a trigger voltage to the trigger electrode for discharging and exciting the test discharge tube X.

In measurement, the capacitance of the main discharge capacitor 17 was fixed at 1,540 μF, and the charge voltage was changed to change the electric input. Further, an interval of light emission of the discharge tube was fixed at 30 seconds, and the light was emitted 2,000 times. The change of quantity of the emitted light after 2,000 times of the light emission from an initial quantity of light was measured. Results are shown in Table 2.

TABLE 2

| Input Electricity | Wall Thickness of Bulb (mm) | Relative Amount of Light of Conventional Tube (%) | Tube of Embodiment: Thickness of Silicon Dioxide Layer (μm) | Tube of Embodiment: Relative Amount of Light (%) |
|---|---|---|---|---|
| 0.92 Ws/mm$^3$ (1540 μF/360 V) | 0.2 | Not Measurable | 0.03 | 75 (n = 6) |
| | | | 0.05 | 81 (n = 5) |
| | | | 0.08 | 82 (n = 8) |
| | | | 0.11 | 85 |
| | | | 0.13 | 80 |
| | 0.4 | Not Measurable | 0.03 | 82 (n = 7) |
| | | | 0.05 | 83 (n = 8) |
| | | | 0.08 | 87 |
| | | | 0.11 | 87 |
| | | | 0.13 | 85 |
| | 0.6 | Not Measurable | 0.03 | 85 |
| | | | 0.05 | 92 |
| | | | 0.08 | 94 |
| | | | 0.11 | 93 |
| | | | 0.13 | 86 |
| 0.90 Ws/mm$^3$ (1540 μF/355 V) | 0.2 | Not Measurable | 0.03 | 87 |
| | | | 0.05 | 94 |
| | | | 0.08 | 95 |
| | | | 0.11 | 95 |
| | | | 0.13 | 90 |
| | 0.4 | Not Measurable | 0.03 | 87 |
| | | | 0.05 | 94 |
| | | | 0.08 | 95 |
| | | | 0.11 | 96 |
| | | | 0.13 | 90 |
| | 0.6 | 85 | 0.03 | 89 |
| | | | 0.05 | 96 |
| | | | 0.08 | 94 |
| | | | 0.11 | 96 |
| | | | 0.13 | 90 |
| 0.85 Ws/mm$^3$ (1540 μF/345 V) | 0.2 | Not Measurable | 0.03 | 89 |
| | | | 0.05 | 95 |
| | | | 0.08 | 96 |
| | | | 0.11 | 96 |
| | | | 0.13 | 90 |
| | 0.4 | 80 (n = 4) | 0.03 | 90 |
| | | | 0.05 | 98 |
| | | | 0.08 | 97 |
| | | | 0.11 | 99 |
| | | | 0.13 | 94 |

TABLE 2-continued

| Input Electricity | Wall Thickness of Bulb (mm) | Relative Amount of Light of Conventional Tube (%) | Tube of Embodiment: Thickness of Silicon Dioxide Layer (μm) | Tube of Embodiment: Relative Amount of Light (%) |
|---|---|---|---|---|
| | 0.6 | 87 | 0.03 | 92 |
| | | | 0.05 | 98 |
| | | | 0.08 | 99 |
| | | | 0.11 | 98 |
| | | | 0.13 | 93 |

"Not measurable" mentioned in columns for the conventional tubes in this table means that all ten samples were broken before reaching 2,000 times due to breakage or crack of the glass bulb or the like, and the relative amount of light was not be able to measured. For example, in the glass bulb of the wall thickness of 0.4 mm for the input energy of 0.85 Ws/mm$^3$, the relative amount of light is 80 (n=4), which means that six out of ten samples were broken before reaching 2,000 times of light emission, and only four samples were tested up to 2,000 times of light emission, and the average is the relative amount of light of 80%.

In the column of the relative amount of light of the tubes of the embodiment, similarly, numericals n=6, 5, . . . show the same case as in the conventional tubes. That is, for the electric input of 0.92 Ws/mm$^3$, for example, the tubes including the bulb of the wall thickness of 0.2 mm and the silicon dioxide film having the thickness of 0.03 μm exhibit the relative amount of light is 75 (n=6). In this case, six samples were tested 2,000 times of emission, and the average of the relative amount of light is 75%. Therefore, four samples were broken before reaching 2,000 times of light emission. The number of samples (n= . . . ) may not be mentioned in the column of the relative amount of light, and this means the numerical value of the relative amount of light is the average of n=10 samples.

As shown in Table 2, at the input electric power of 0.92 Ws/mm$^3$, four samples of the discharge tubes including the glass bulbs of the wall thickness of 0.2 mm and the silicon dioxide films of the thickness of 0.03 μm failed before reaching 2,000 times of light emission. Similarly, five samples of the discharge tubes including the glass bulbs of the wall thickness of 0.2 mm and the silicon dioxide films of the thickness of 0.05 μm failed, and two samples of the discharge tubes including the glass bulbs of the wall thickness of 0.2 mm and the silicon dioxide films of the thickness of 0.08 μm failed. Out of the glass bulb of the wall thickness of 0.4 mm, three samples having the silicon dioxide film of the thickness of 0.03 μm failed before 2,000 times of light emission, and two samples having the silicon dioxide film of the thickness of 0.05 μm failed.

At the input electric power of 0.90 Ws/mm$^3$ or 0.85 Ws/mm$^3$, the discharge tubes having the glass bulbs of the wall thickness ranging from 0.2 mm to 0.6 mm and the silicon dioxide film of thickness of 0.03 μm were completely tested 2,000 times of light emission.

The tubes having the silicon dioxide film of the thickness of 0.03 μm and 0.13 μm and the glass bulb of the wall thickness of 0.2 mm exhibited the relative amount of light of 87% and 90% at the input of 0.90 Ws/mm$^3$, respectively. The relative amount of light was smaller than that of other tubes having the film of the thickness ranging from 0.05 μm to 0.11 μm. A similar tendency is observed in the glass bulbs of the wall thicknesses of 0.4 mm and 0.6 mm, and the tubes having the silicon dioxide film of the thickness too thin or too thick exhibited small relative amounts of light. In this respect, the similar results were observed for all glass bulbs of the wall thickness ranging from 0.2 mm to 0.6 mm and for the electric input of 0.85 Ws/mm$^3$.

A discharge tube, exhibiting the relative amount of light oh 90% after 1,000 times or 2,000 times of light emission with respect to an initial amount of light, is practically sufficient for use in the photographic strobe device or the photographic camera.

tional tubes is indicated as an electric power converted to that for the inner volume when the charging energy for charging a main discharge capacitor of 1,540 $\mu$F to 340V is supplied between the main electrodes. The electric input to the tubes of the embodiment is indicated as an electric power converted to that for the inner volume when the charging energy for charging a main discharge capacitor of 1,540 $\mu$F to 355V is supplied between the main electrodes.

TABLE 3

| | Inner Diameter $\phi$1 (mm) | Outer Diameter $\phi$2 (mm) | Distance between Electrodes L (mm) | Volume (mm$^3$) | Ratio of Volume | Pressure of Gas (KPa) | Electric Input (Ws/mm$^3$) |
|---|---|---|---|---|---|---|---|
| Conventional Tube | 2.3 | 3.5 | 29.5 | 283.7 | 100 | 100 | 0.72 |
| Tube of Embodiment | 2.3 | 3.0 | 26.0 | 183.7 | 64.8 | 100 | 0.90 |

Hence, considering an optimum condition of the electric input and a thickness of the silicon dioxide film of discharge tubes having glass bulb of a wall thickness ranging from 0.2 mm to 0.6 mm for practical use, the electric input of 0.92 Ws/mm$^3$ causes the discharge tubes having the glass bulb of the wall thicknesses of 0.2 mm and 0.4 mm to exhibit emission failure, and hence this electric input is not practically preferred for the life of emission. From the viewpoint of the emission life, the electric input not larger than 0.90 Ws/mm$^3$ is qualified as the condition.

From the viewpoint of the relative amount of light not less than 90% after 2,000 times of light emission, the silicon dioxide film preferably has a thickness ranging from 0.05 to 0.11 $\mu$m.

Out of samples of the conventional discharge tubes, only a tube having the glass bulb of the wall thickness of 0.6 mm successfully tested 2,000 times of light emission for the input not larger than 0.90 Ws/mm$^3$. However, the electric input of 0.92 Ws/mm$^3$ caused the conventional tubes having the glass bulb of the wall thickness of 0.6 mm to fail before 2,000 times of light emission. The tubes having the glass bulb of the wall thickness of 0.6 mm and provided with the input of 0.90 Ws/mm$^3$ exhibited the relative amount of light of 85%, and the tubes having the glass bulb of the wall thickness of 0.6 mm and provided with the input of 0.85 Ws/mm$^3$ exhibited the relative amount of light of 87%. The relative amounts of the conventional tubes are less than 90%, which is required for practical use, and smaller than those of the tubes of the embodiment at any input condition.

Thus, the discharge tubes of the embodiment were confirmed to be superior to the conventional tubes in both aspects of emission life and the relative amount of light.

Dimensions required for obtaining a light emission equivalent to the above from the discharge tubes of the embodiment and the conventional tubes will be described with referring to a schematic diagram of the discharge tube shown in FIG. 6.

Table 3 shows the outside diameter and the inside diameter of the glass bulb, a distance between the electrodes, a volume in the distance between the electrodes, a pressure of the gas, and an electric input necessary for obtaining an equivalent relative amount of light. In the discharge tubes of the embodiment, the silicon dioxide film applied on the inner surface of the glass bulb has a wall thickness of 0.05 $\mu$m. The electric input is shown as a value with respect to a unit volume of the glass bulb. The electric input for the conven- As shown in Table 3, the discharge tube of the embodiment including the glass bulb of the wall thickness of 0.35 mm and the silicon dioxide film of the thickness of 0.05 $\mu$m with the input of 0.90 Ws/mm$^3$ exhibited a relative amount of light equivalent to that of the conventional discharge tube.

The Volume V between the main electrodes (distance L) of the conventional discharge tube and the tube of the embodiment:

$$V = L \times \pi \times (\phi 2/2)^2$$

are 283.7 mm$^3$ and 183.7 mm$^3$, respectively. Therefore, the ratio of the volume of the discharge tube of the embodiment to the conventional tube is 64.8%, and the volume is thus reduced by 35.2%. The ratio of the volume is the same for the entire structure including the sealing portions of the discharge tube corresponding to the electrodes. The volume of the sealing portions of the main electrodes and glass bulb depends mainly upon the specification and a method of manufacturing the discharge tube, but the volume including the portions is not significantly different from the volume excluding the portions for both the conventional discharge tube and the discharge tube of the embodiment. The volume of the portion between the main electrodes is important for reducing its size, and hence, the discharge tube of the embodiment can have the size smaller than the conventional tubes.

Figure 7:
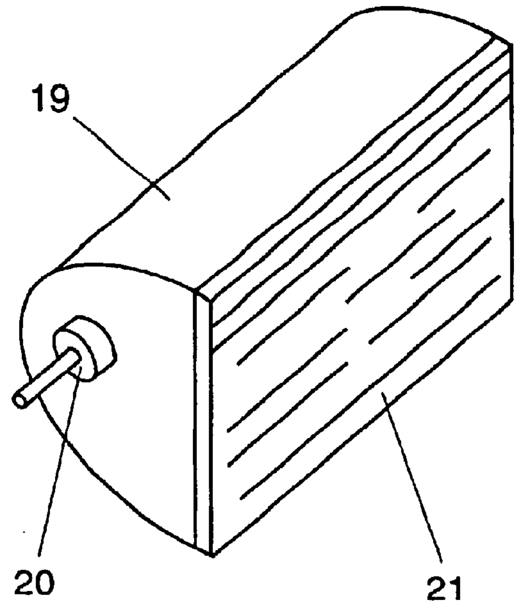
FIG. 7 is a perspective view of a reflector incorporating the discharge tube of embodiment 1.

The discharge tube, upon being assembled into a photographic strobe device or photographic camera, is first incorporated into a reflector having an inner surface reflecting light efficiency. FIG. 7 is a perspective view of the reflector having the discharge tube assembled in it. The inner surface of the reflector 19 made of resin or aluminum in which a discharge tube 20 is located is coated with a light reflective layer formed by silver evaporation or the like in order to reflect the light efficiently. The front surface of the reflector 19 is provided with a light emission panel 21 made of light permeable resin in order to adjust the light emission characteristic from the discharge tube 20.

The size of the reflector 19 is related to the size of the discharge tube 20 to be incorporated, and therefore, the reflector having the discharge tube of the embodiment having the small size has a reduced size as mentioned above according to the reduced volume of the discharge tube. Accordingly, the strobe device or camera incorporating them can also have a reduced size according to the size of the reduced portions of the discharge tube and the reflector.

Embodiment 2

Figure 8:
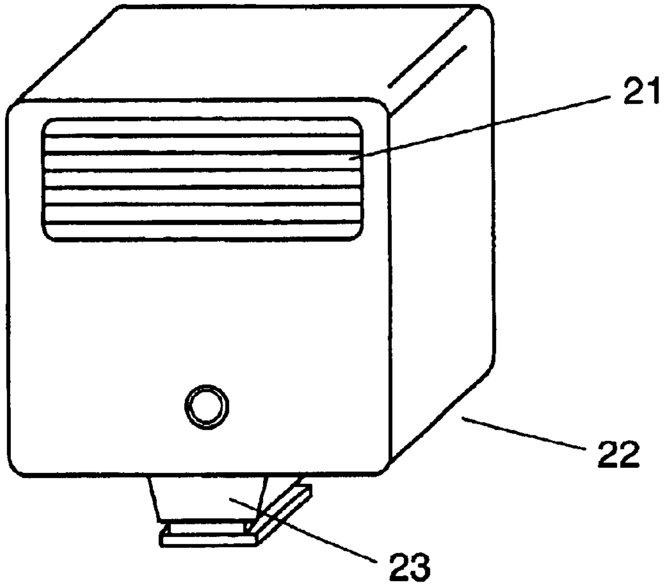
FIG. 8 is a perspective view of a strobe device according to exemplary embodiment 2 of the invention.

FIG. 8 is a perspective view of a photographic strobe device 22 according to exemplary embodiment 2 of the invention. The strobe device 22 includes circuits and parts necessary for having an electric discharge tube emit light, such as a direct-current power source, a main discharge capacitor, and a trigger circuit in an emission test circuit in FIG. 5. The device 22 further includes the discharge tube and a reflection umbrella shown in FIG. 7. The photographic strobe device according to this embodiment incorporates the discharge tube and the reflector having reduced sizes, hence having a reduced size. The strobe device 22 includes a light emission panel 21 shown in FIG. 7, and a mounting block 23 to be mounted on a photographic camera.

Embodiment 3

Figure 9:
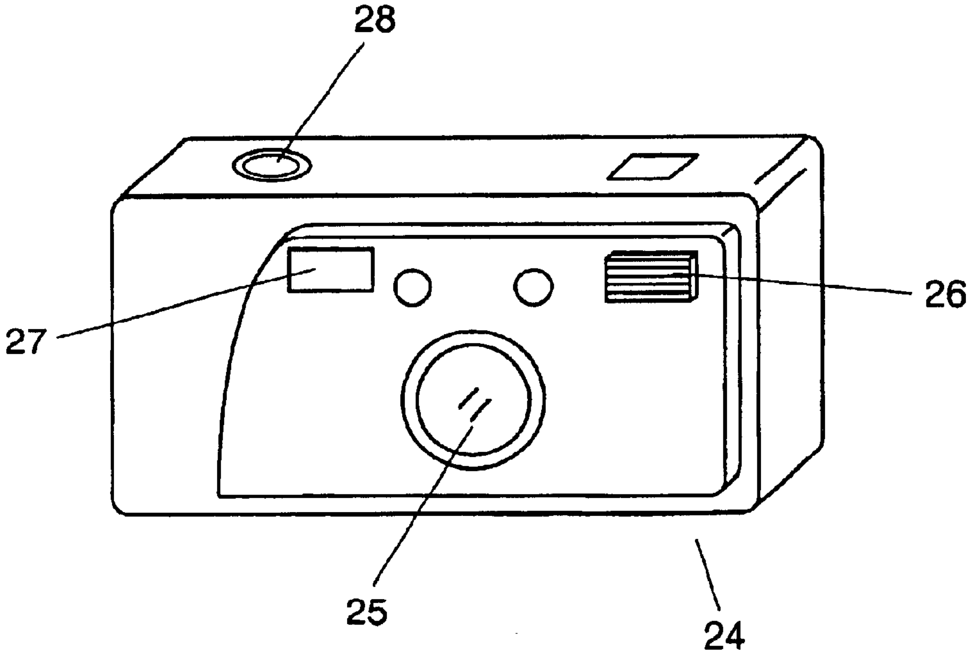
FIG. 9 is a perspective view of a camera according to exemplary embodiment 3 of the invention.

FIG. 9 is a perspective view of a photographic camera according to exemplary embodiment 3 incorporating an electric discharge tube of the invention. A camera 24 includes a lens 25, a light emission panel 26 attached to the front face of a reflector incorporating the discharge tube, a finder 27, a shutter button 28, and other operation switches and electric circuits not shown in the drawing. This camera may be either a camera using silver-salt film, or a camera including CCS, i.e., so-called digital still camera, for electronic recording on electronic recording medium.

The photographic strobe device and the photographic camera shown in FIG. 8 and FIG. 9 can have reduced sizes according to reduced sizes of the discharge tube and the reflector, thus having a portability.

If an extra space is needed for adding new functions, it is not required to increase the volume of the strobe device or the photographic camera. In this camera, the volume space corresponding to the reduced sizes of the discharge tube and the reflector can be maintained, so that this space may be utilized effectively.

Embodiment 4

Figure 10:
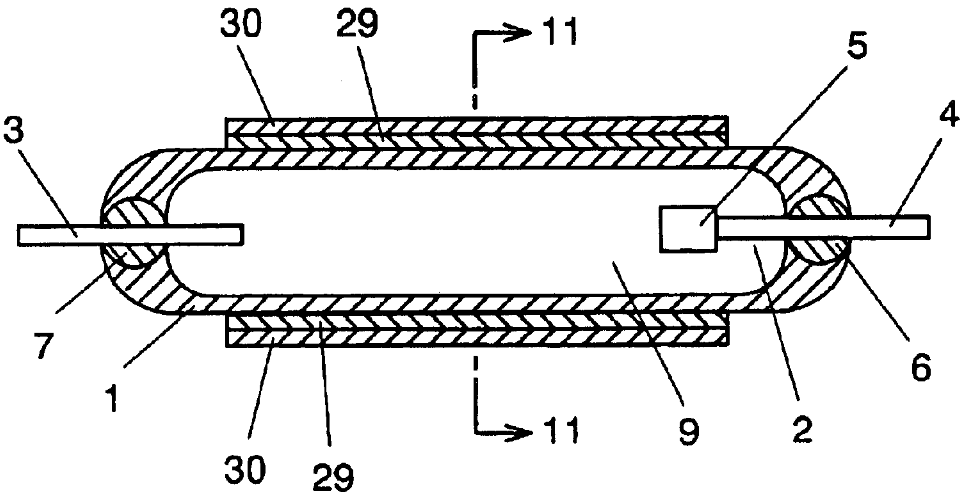
FIG. 10 is a sectional view of an electric discharge tube according to exemplary embodiment 4 of the invention.
Figure 11:
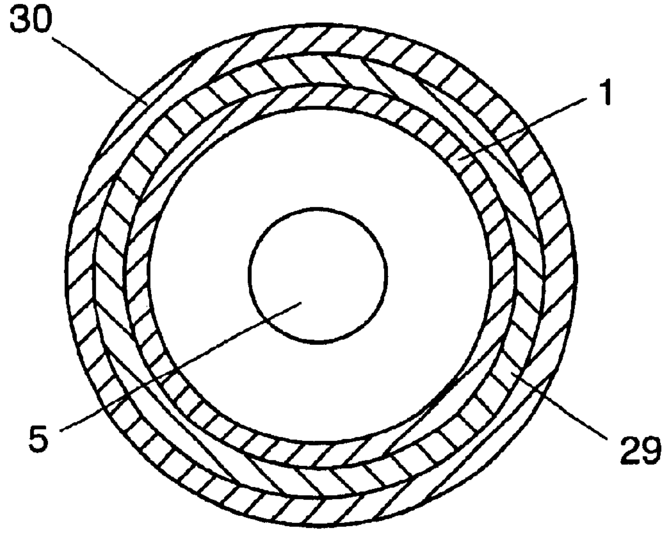
FIG. 11 is a sectional view along line 11—11 of the discharge tube shown in FIG. 10.

FIG. 10 is a sectional view of an electric discharge tube according to exemplary embodiment 4 of the invention. FIG. 11 is a sectional view along line 11—11 of the discharge tube shown in FIG. 10. In these drawings, elements denoted by the same reference numerals as in the discharge tube of embodiment 1 have the same functions, and their explanation is omitted.

The discharge tube of the present embodiment shown in FIG. 10 and FIG. 11 includes a trigger electrode 29 as a transparent conductive film formed on an outer periphery of a glass bulb 1, and a protective film 30 of silicon dioxide for covering the outer surface of the trigger electrode 29.

The trigger electrode 29 and protective film 30 of silicon dioxide are formed as shown below.

First, insulating masking material made of mixed solution of aluminosilicate mineral and water or mixed solution of aluminum oxide and water is applied on inner and outer surfaces of a sealing portion of a glass tube on which a main electrode 2, i.e., a cathode electrode, and a main electrode 3, i.e., an anode electrode are provided, and is then dried. Then, the glass tube coated with the masking material is put in a high-temperature furnace of about 600° C., and chloride solution of tin and methanol or chloride solution of indium and ethanol is atomized and sprayed toward the glass tube heated in this high-temperature furnace. Then, the trigger electrode 29 of the transparent conductive film made of tin oxide or indium oxide is formed in a predetermined area of the outer circumference of the glass tube (that is, an area except for a position corresponding to the sealing portions corresponding to the anode electrode 3 and cathode electrode 2).

Then, the lower end of the glass tube is closed so that silanol solution may not enter into the glass tube. The glass tube having the trigger electrode 29 and the applied masking material is immersed in the silanol solution shown in Table 1 from the closed lower end, and further immersed up to the masking position at the upper end. Then, the glass tube is lifted up from the silanol solution, thus applying a silanol film on the outer circumference of the trigger electrode 29.

The glass tube thus coated with the silanol film is put in a high-temperature furnace, and the temperature in the furnace is raised gradually to bake the silanol film, thus providing a protective film 30 covering the trigger electrode 29.

The glass tube coated with the protective film 30 is took out of the high-temperature furnace, and the masking material applied on the sealing portion of the electrodes 2, 3 is removed by brushing the material, thus providing the trigger electrode 29 and protective film 30 formed on the outer circumference of the glass tube 1.

The glass bulb 1 having the cathode electrode 2, the trigger electrode 29 and the protective film 30 at one end of the glass tube is installed in an exhaust and sealing container, while the anode electrode 3 having a bead glass 7 inserted from the other opening. The glass tube having the cathode electrode 2 sealed and the anode electrode 3 inserted is sucked to remove impurity gas in the tube, and is then filled with xenon gas at a predetermined pressure. In this state, the anode electrode 3 is fused at the opening of the glass bulb 1 with the bead glass 7, thus providing the discharge tube of the present embodiment.

The trigger electrode 29 and the protective film 30 of silicon dioxide may be formed in the following method. In the glass bulb 1 filled with rare gas with the main electrodes, i.e., the cathode electrode 2 and the anode electrode 3 sealed on the glass bulb, the sealing portions corresponding to the main electrodes 2, 3 in an unnecessary portion for the trigger electrode 29 and the protective film 30 of silicon dioxide is coated with the masking material.

Then, a trigger electrode 29 of a transparent conductive film is formed on the outer circumference of the glass bulb 1. A a protective film 30 of silicon dioxide is formed to cover the trigger electrode 29. The masking material is removed from the sealing portions corresponding to the main electrodes 2, 3. Therefore, similarly to the discharge tube of embodiment 1, the discharge tube of embodiment 4, including the glass bulb 1 having a small diameter and a small wall thickness, includes the protective film 30 preventing the glass bulb 1 from being cracked. Even if micro cracks are formed, the protective film 30 prevents the cracks from growing. The cracks do not directly break the glass bulb 1 differently from the conventional tube. Therefore, the strength of the glass bulb is enhanced extremely, and the discharge tube has a long life and a reduced size.

In the discharge tube of embodiment 4, similarly to the tube of embodiment 1, the main electrode 2, i.e., the cathode electrode includes a metal body and a sintered metal body, but the electrode may includes only the metal body similarly to the anode electrode 3.

A photographic strobe device or a photographic camera including the discharge tube of embodiment 4 has a small size.

In the discharge tube of embodiment 4, the glass tube is immersed in the silanol solution and then is baked at the high temperature to form the protective film 30 on the surface of the trigger electrode 29 of the glass bulb 1. The method of forming the protective film 30 is not limited to this process. The film 30 may be formed, for example, by a chemical vapor deposition (CVD) method by placing the glass tube in vapor atmosphere of silanol solution, forming a thin film of silanol on the trigger electrode 29, and baking the film in the similar process.

Embodiment 5

Figure 12:
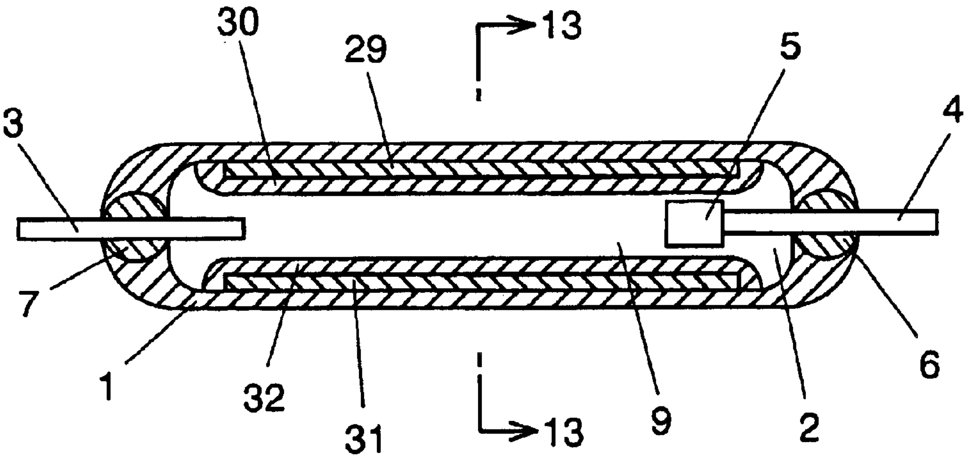
FIG. 12 is a sectional view of an electric discharge tube according to exemplary embodiment 5 of the invention.
Figure 13:
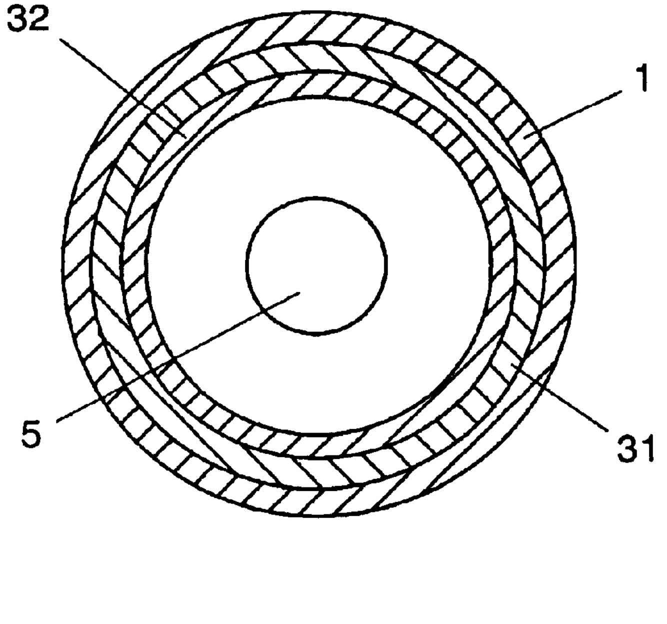
FIG. 13 is a sectional view along line 13—13 of the discharge tube shown in FIG. 12.

FIG. 12 is a sectional view of an electric discharge tube according to exemplary embodiment 5 of the invention, and FIG. 13 is a sectional view along line 13—13 of the discharge tube shown in FIG. 12. Elements denoted by the same numerals as those in the discharge tube of embodiment 1 or 4 have the same functions, and their explanation is omitted.

While, in the discharge tube of embodiment 4, the trigger electrode and protective film are laminated and formed on the outer circumference of the glass bulb, in the discharge tube of embodiment 5, a trigger electrode 31 and a protective film 32 are laminated and formed on the inner circumference of the glass bulb 1.

Figure 14A:
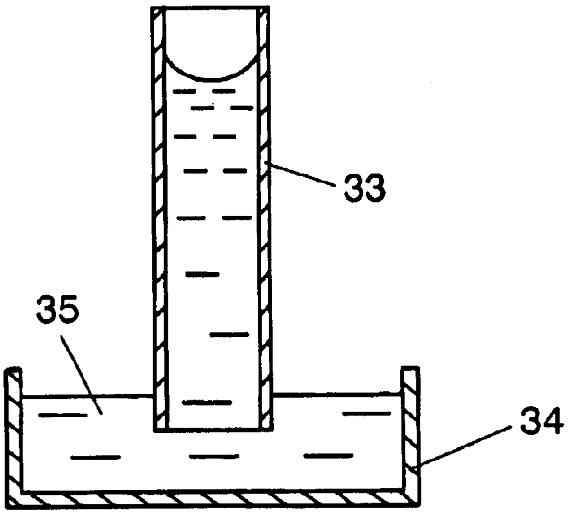
FIG. 14A is a sectional view showing a method of forming a trigger electrode inside of a glass tube of the discharge tube according to embodiment 5.
Figure 14B:
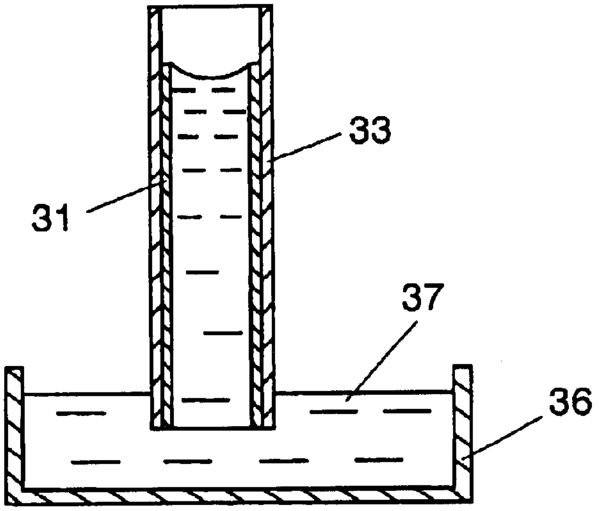
FIG. 14B is a sectional view showing a method of forming a conductive film and a protective film of silicon dioxide of the trigger electrode inside of the glass tube of the discharge tube according to embodiment 5.

A method of forming the trigger electrode and the protective film will be explained. FIG. 14A and FIG. 14B are explanatory diagrams for showing the method of forming the trigger electrode 31 and the protective film 32 of silicon dioxide. FIG. 14A shows a method of forming the trigger electrode 31 on the inner circumference of the glass bulb 1, and FIG. 14B shows a method of forming the protective film 32 of silicon dioxide to cover the surface of trigger electrode 31.

A film of the insulating masking material described above is applied to a sealing portion of a glass tube 33 corresponding to an anode electrode 3.

The glass tube 33 coated with the masking material is immersed in chloride solution 35 of tin or indium and ethanol contained in a first container 34, as shown in FIG. 14A, while a sealed end of the anode electrode 3 is directed downward. In this state, the glass tube 33 is evacuated by a vacuum pump (not shown) coupled to the upper portion of the glass tube. Then, as shown in FIG. 14A, the chloride solution 35 in the first container 34 rises in the glass tube 33, and the inner circumference of the glass tube 33 is immersed in the chloride solution 35 up to a sealing portion corresponding to the cathode electrode 2.

Then, the glass tube 33 is returned at a normal pressure, and the chloride solution 35 is lowered, and thus, a thin film of chloride solution 35 is applied on the inner circumference. The glass tube 33 is put in a high-temperature furnace of about 600° C., and the thin film of chloride solution 35 is baked to form a trigger electrode 31 of a transparent film of tin oxide or indium oxide in a predetermined area of the inner circumference of the glass tube 33.

The glass tube 33 having the trigger electrode 31 formed on its inner circumference is then put in silanol solution 37 shown in Table 1 in a second container 36, and an edge of the glass tube 33 at the anode electrode 3 coated with the masking material is immersed in the solution. Then, by evacuating by a vacuum pump (not shown) connected to the glass tube, the silanol solution 37 is raised in the glass tube 33, as shown in FIG. 14B, up to the sealing portion corresponding to the cathode electrode 2 so as to cover the trigger electrode 31.

The silanol solution 37 in the glass tube 33 is lowered as the glass tube 33 is returned to the normal pressure, and thus a silanol film covering the trigger electrode 31 formed on the inner circumference of the glass tube 33 is formed. The glass tube 33 coated with the silanol film is put in a high-temperature furnace, and is gradually heated and baked similarly to the tube of the foregoing embodiments, thus forming a protective film 32 of silicon dioxide.

The glass tube 33 is took out of the high-temperature furnace, and the film of the masking material formed at the sealed end corresponding to the anode electrode 3 is removed by brushing the material. The protective film 32 thus formed covers the entire trigger electrode 31, as shown in FIG. 12 and FIG. 13, so that the protective film 32 is securely formed among the anode electrode 3, the cathode electrode 2, and the trigger electrode 31.

Then, the cathode electrode 2 is sealed at the end portion of the glass tube 33 with the bead glass 6. The glass tube 33 having the trigger electrode 31 and protective film 32 is installed in an exhaust and sealing container, while the anode electrode 3 having the bead glass 7 inserted from other opening of the tube. In the exhaust and sealing container, the impurity gas is removed by suction, and rare gas, such as xenon, is introduced at a predetermined pressure to have the tube filled with the xenon gas. In this state, the anode electrode 3 is fused and sealed at the opening of the glass tube 33 with the bead glass 7, thus providing the discharge tube of embodiment 5 shown in FIG. 12.

In the discharge tube of embodiment 5, as mentioned above, the trigger electrode 31 of a transparent conductive film is formed on the inner circumference of the glass bulb 1 filled with the rare gas, such as xenon, at the predetermined pressure. A pair of the main electrodes (anode electrode 3 and cathode electrode 2) facing each other are provided at both ends of the glass bulb 1. The protective film 32 of silicon dioxide having a large insulation and formed on the inner circumference of the trigger electrode 31 reinforces the glass bulb 1. Therefore, the film prevents the glass bulb 1 from being cracked due to an impact of an electric input for light emission applied to the electrodes. Even if micro cracks are formed, the cracks are prevented from growing, and the glass bulb 1 is securely prevented from being broken. Therefore, the discharge tube of the present embodiment having the reinforced glass bulb has a size and diameter smaller than the conventional discharge tube.

In addition, in the discharge tube of embodiment 5, the trigger electrode 31 provided in the glass bulb, and is coated with the protective film 32. This arrangement prevents the discharge tube from causing a short-circuiting between the trigger electrode and the main electrodes due to a high trigger voltage. Hence, the discharge tube is prevented from emission failure due to the short-circuiting.

In the discharge tube of embodiment 5, the protective film 32 is formed by heating the glass tube 32 having the silanol film formed on the trigger electrode 31 at the predetermined temperature similarly to the foregoing embodiments. As a result, the discharge tube 1 having the protective film 32 for covering the trigger electrode 31 can be manufactured simply.

In the discharge tube of embodiment 5, the main electrode 2, i.e., the cathode electrode includes a metal body and a sintered metal body, but may includes only a metal body similarly to the main electrode 3, i.e., the anode electrode.

In a photographic strobe device using the discharge tube of embodiment 5, even when a high trigger voltage is applied, electricity is not discharged between the trigger electrode and anode electrode or the cathode electrode, and the electrodes are not short-circuited. Thus, inconvenience for normal photography due to emission failure of the discharge tube can be securely prevented.

In the discharge tubes of embodiments 1, 4 and 5, the protective film formed inside or outside of the glass bulb is formed by immersing the glass tube for forming the glass bulb in the silanol solution, by applying a film of silanol solution, and by baking the film by heating in gradual steps.

A method for forming the protective film of silicon dioxide formed on the glass bulb is not limited to this method. For example, the silanol film may be applied by a chemical vapor deposition (CVD) method by placing the glass tube in vapor atmosphere of silanol solution, and laminating a thin film of silanol on the inner or outer surface of the glass tube. Then, the silanol film is baked as mentioned above, thus providing the protective film formed on the glass bulb.

According to embodiment 1, a state of the protective film of silicon dioxide is indicated by its thickness, but not limited to the thickness, the state may be indicated by its weight. Table 4 shows a comparison of the thickness and the weight of the film of silicon dioxide. The weight of glass tube or glass bulb having no protective film is measured, and the thickness of the protective film formed on the glass tube or glass bulb is measured by Auger electron analysis. Then, the weight of the glass tube or glass bulb is measured, so that the weight corresponding to the thickness of the protective film of silicon dioxide can be calculated.

TABLE 4

| Thickness of $SiO_2$ film ($\mu$m) | Weight of $SiO_2$ Film ($\mu$g/mm$^2$) |
|---|---|
| 0.05 | 0.35 |
| 0.08 | 0.50 |
| 0.11 | 0.60 |

INDUSTRIAL APPLICABILITY

An electric discharge tube according to the present invention includes a glass bulb having a wall thickness ranging from 0.2 to 0.6 mm filled with rare gas, a pair of main electrodes provided at both ends of the glass bulb, respectively, a trigger electrode formed on the outer surface of the glass bulb, and a film of silicon dioxide having a thickness ranging from 0.05 to 0.11 $\mu$m formed on the inner surface of the glass bulb. An electric power not larger than 0.90 Ws/mm$^3$ with respect to the inner volume of the glass bulb is applied between the main electrodes.

The discharge tube includes the protective film provided under the above condition, thus being prevented from cracks due to the electric input, and even if the cracks are formed, the cracks is prevented from growing. Further, the discharge tube withstands emission test of 2,000 times. After multiple times of emission, the discharge tube emits light substantially not declining from the initial amount of light emitted, thus emitting light stably.

Since the glass bulb is practically reinforced more than a conventional electric discharge tube, the discharge tube of the invention has a total volume reduced significantly. A photographic strobe device and a photographic camera using this discharge tube have small sizes, thus being more practical.

What is claimed is:

1. An electric discharge tube comprising:

a glass bulb having a wall thickness ranging from 0.2 to 0.6 mm and filled with rare gas;

a pair of main electrodes provided at both ends of said glass bulb, respectively;

a trigger electrode formed on an outer surface of said glass bulb; and a film of silicon dioxide having a thickness ranging from 0.05 to 0.11 $\mu$m and formed on an inside of said glass bulb, wherein an electric power not larger than 0.90 Ws/mm$^3$ with respect to an inner volume of said glass bulb is applied between said main electrodes.

2. An electric discharge tube comprising:

a glass bulb having a wall thickness ranging from 0.2 to 0.6 mm and filled with rare gas;

a pair of main electrodes provided at both ends of said glass bulb, respectively;

a trigger electrode formed on an outside of said glass bulb; and a film of silicon dioxide having a thickness ranging from 0.05 to 0.1 $\mu$m for covering an outside of said trigger electrode, wherein an electric power not larger than 0.90 Ws/mm$^3$ with respect to an inner volume of said glass bulb is applied between said main electrodes.

3. An electric discharge tube comprising:

a glass bulb having a wall thickness ranging from 0.2 to 0.6 mm and filled with rare gas;

a pair of main electrodes provided at both ends of said glass bulb, respectively, a trigger electrode formed on an inside of said glass bulb; and a film of silicon dioxide having a thickness ranging from 0.05 to 0.1 $\mu$m for covering said trigger electrode, wherein an electric power not larger than 0.90 Ws/mm$^3$ with respect to an inner volume of said glass bulb is applied between said main electrodes.

4. The electric discharge tube of any one of claims 1 to 3, wherein an weight of said film ranges from 0.35 to 0.60 $\mu$g/mm$^2$.

5. The electric discharge tube of any one of claims 1 to 3, wherein at least one of said main electrodes includes a tungsten metal body, at least a portion of said tungsten metal body being sealed in said glass bulb, a nickel metal body connected to said tungsten metal body, and a sintered metal body provided at a leading end of said tungsten metal body, said sintered metal body being positioned inside of said glass bulb.

6. The electric discharge tube of any one of claims 1 to 3, wherein said film is provided by forming a silanol film on said glass tube before sealing said glass bulb, and by baking said silanol film.

7. The electric discharge tube of claim 6, wherein said film is provided by baking said silanol film by heating gradually from a first temperature to a second temperature.

8. The electric discharge tube of claim 6, wherein said flu is provided by immersing a portion of said silanol film for sealing said main electrode of said glass bulb in silanol-removing agent, and by cleaning and removing said silanol film.

9. The electric discharge tube of claim 8, wherein said silanol-removing agent includes aqueous solution of one of sodium hydroxide, potassium hydroxide, hydrofluoric acid, and ammonium fluoride.

10. The electric discharge tube of claim 2, wherein said film is provided by applying a silanol film on said glass bulb except for a portion of said main electrodes, and baking said silanol film by raising a temperature of said glass bulb in gradual steps.

11. A method of manufacturing an electric discharge tube, comprising the steps of:

forming a trigger electrode on an outer surface of a glass tube;

forming a silanol film on the glass tube;

forming a film of silicon dioxide by baking the silanol film by raising a temperature of the glass tube having the silanol film from a first temperature to a second temperature higher than the first temperature; and sealing both ends of the glass tube with a pair of main electrodes respectively, to provide a glass bulb, and filling the glass bulb with are gas.

12. The method of claim 11, wherein said step of forming the film comprises the sub-step of heating the silanol film in gradual steps from the first temperature to the second temperature.

13. The method of claim 11, further comprising the step of removing a portion of the silanol film on the glass bulb corresponding to the main electrodes by immersing the portion of the silanol film in silanol-removing agent and cleaning the portion of the silanol film.

14. The method of claim 13, wherein the silanol-removing agent includes aqueous solution of one of sodium hydroxide, potassium hydroxide, hydrofluoric acid, and ammonium fluoride.

15. The method of claim 11, wherein at least one of the main electrodes includes a metal body including a tungsten metal body and a nickel metal body connected to the tungsten body, and a sintered metal body provided at a leading end of the tungsten metal body, and wherein said step of sealing the both ends of the glass tube comprises the sub-step of sealing the glass bulb with at least a portion of the tungsten metal body in the glass bulb while positioning the sintered metal body inside of the glass bulb.

16. A method of manufacturing an electric discharge tube, comprising the steps of:

forming a trigger electrode on an outer surface of a glass bulb having pair of main electrodes and filled with rare gas so that the trigger electrode is provided except for respective sealing portions corresponding to the main electrodes, forming a silanol film for covering the trigger electrode, and baking the silanol film by raising a temperature at the glass bulb having the silanol film.

17. A strobe device comprising:

said electric discharge tube of any one of claims 1 to 3;

a reflector having said electric discharge tube incorporated thereto for reflecting light emitted from said electric discharge tube;

a capacitor charged by a power source, for supplying an energy to said electric discharge tube; and a trigger circuit for supplying a trigger voltage to said electric discharge tube.

18. A camera comprising:

said electric discharge tube of any one of claims 1 to 3;

a reflector having said electric discharge tube incorporated thereto, for reflecting light emitted from said electric discharge tube;

a capacitor charged by a power source, for supplying an energy to said electric the discharge tube; and a trigger circuit for supplying a trigger voltage to said electric discharge tube.

19. The strobe device of claim 17, wherein an weight of said film ranges from 0.35 to 0.60 $\mu$g/mm$^2$.

20. The strobe device of claim 17, wherein at least one of said main electrodes includes a tungsten metal body, at least a portion of said tungsten metal body being sealed in said glass bulb, a nickel metal body connected to said tungsten metal body, and a sintered metal body provided at a leading end of said tungsten metal body, said sintered metal body being positioned inside of said glass bulb.

21. The strobe device of claim 17, wherein said film is provide by forming a silanol film on said glass tube before sealing said glass bulb, and by baking said silanol film.

22. The camera of claim 18, wherein an weight of said film range from 0.35 to 0.60 $\mu$g/mm$^2$.

23. The camera of claim 18, wherein at least one of said main electrodes includes a tungsten metal body, at least a portion of said tungsten metal body being sealed in said glass bulb, nickel metal body connected to said tungsten metal body, and a sintered metal body provided at a leading end of said tungsten metal body, said sintered metal body being positioned inside of said glass bulb.

24. The camera of claim 18, wherein said film is provided by forming a silanol film on said glass tube before sealing said glass bulb, and by baking said silanol film.

* * * * *